Oct. 17, 1950  M. HATTAN  2,525,798
SHOCKLESS PARACHUTE
Filed March 8, 1948  4 Sheets-Sheet 1
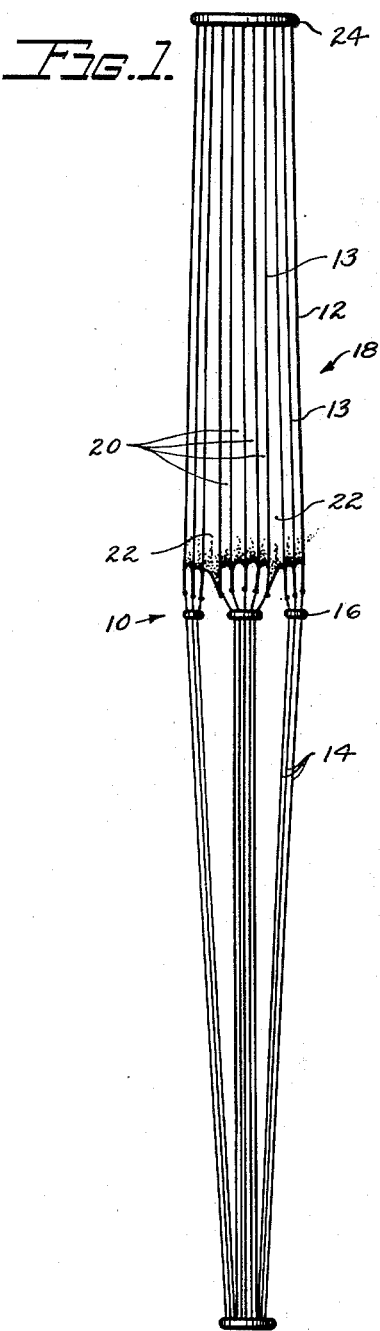
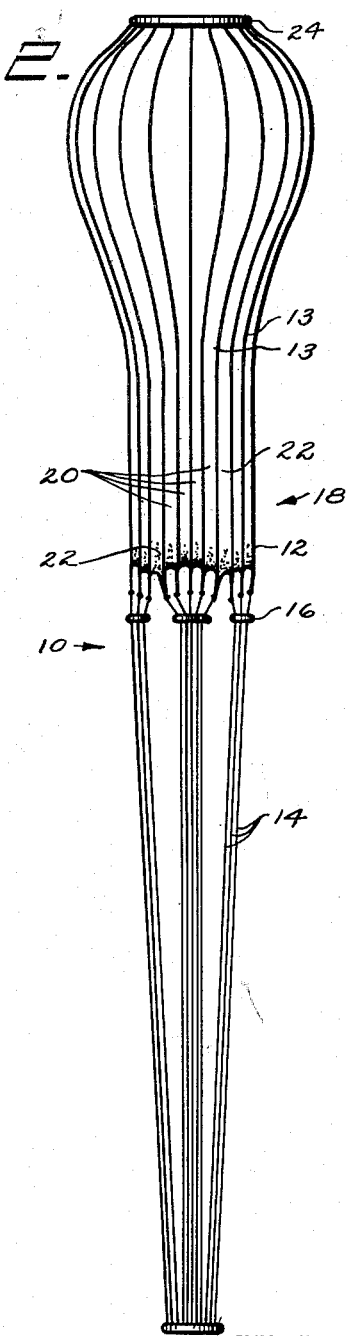
INVENTOR.
MARK HATTAN
BY Wade Kontz AND
Frederick W. Cotterman
ATTORNEYS

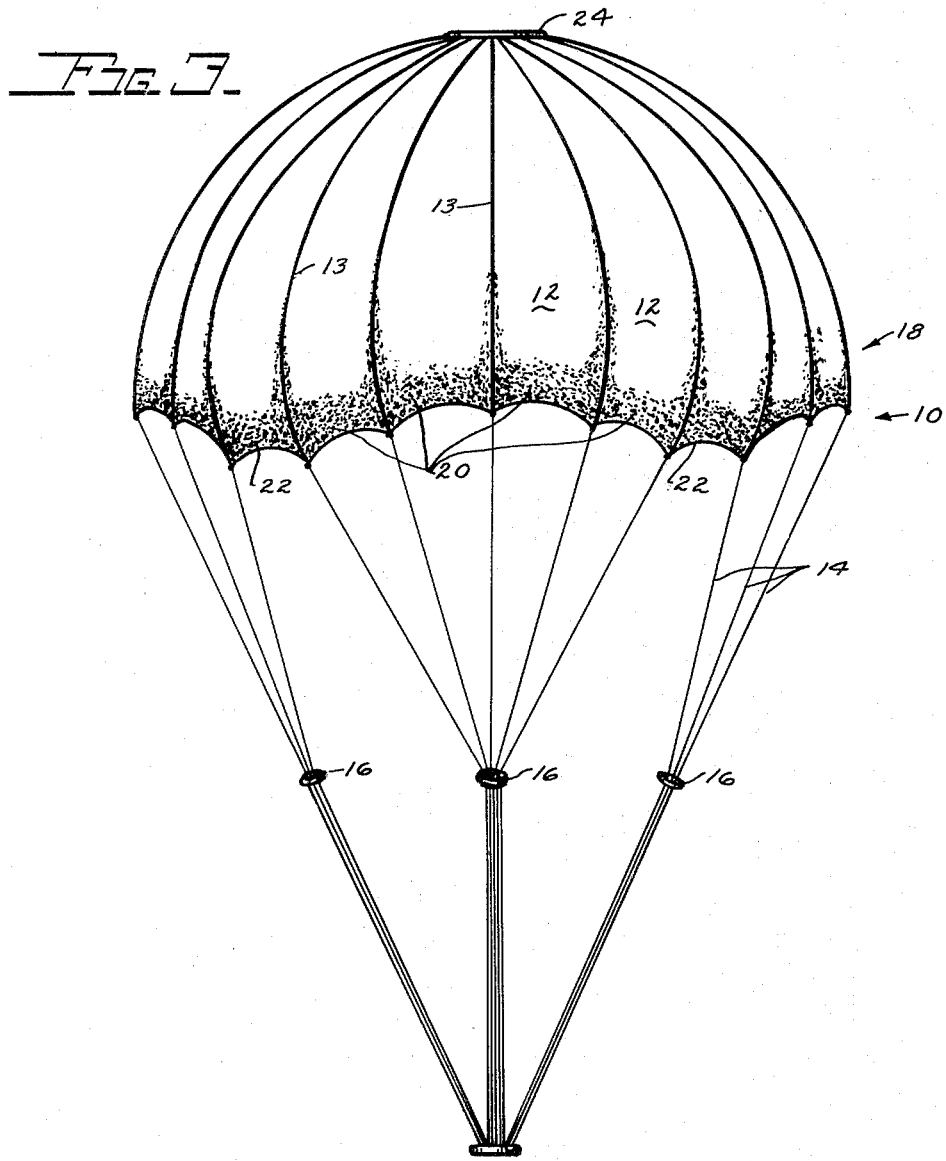

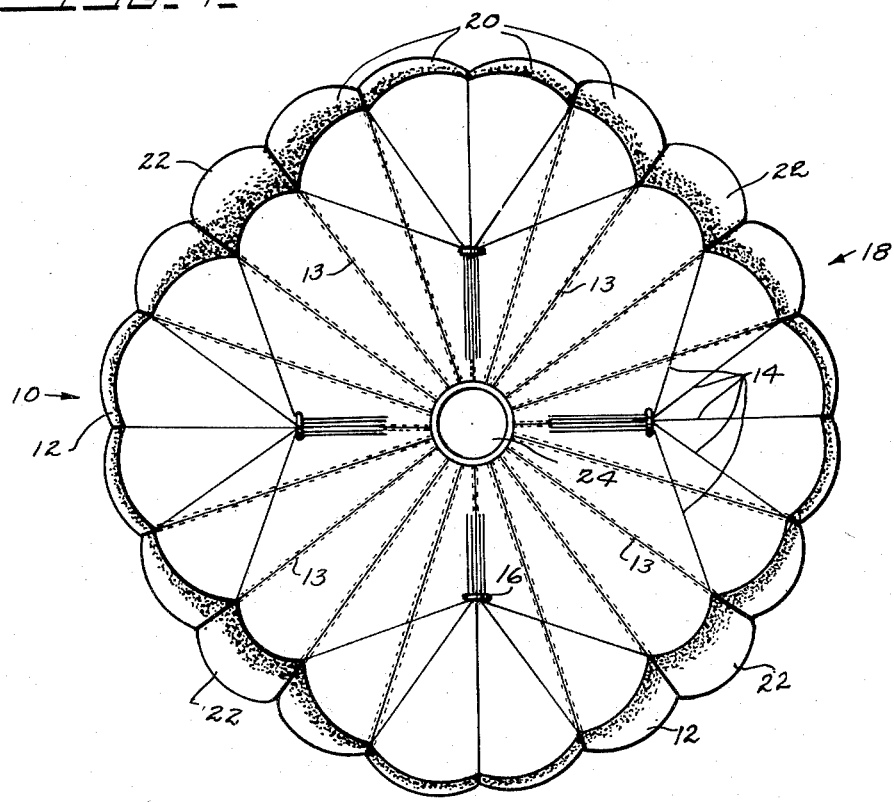

Oct. 17, 1950  M. HATTAN  2,525,798
SHOCKLESS PARACHUTE
Filed March 8, 1948  4 Sheets-Sheet 4
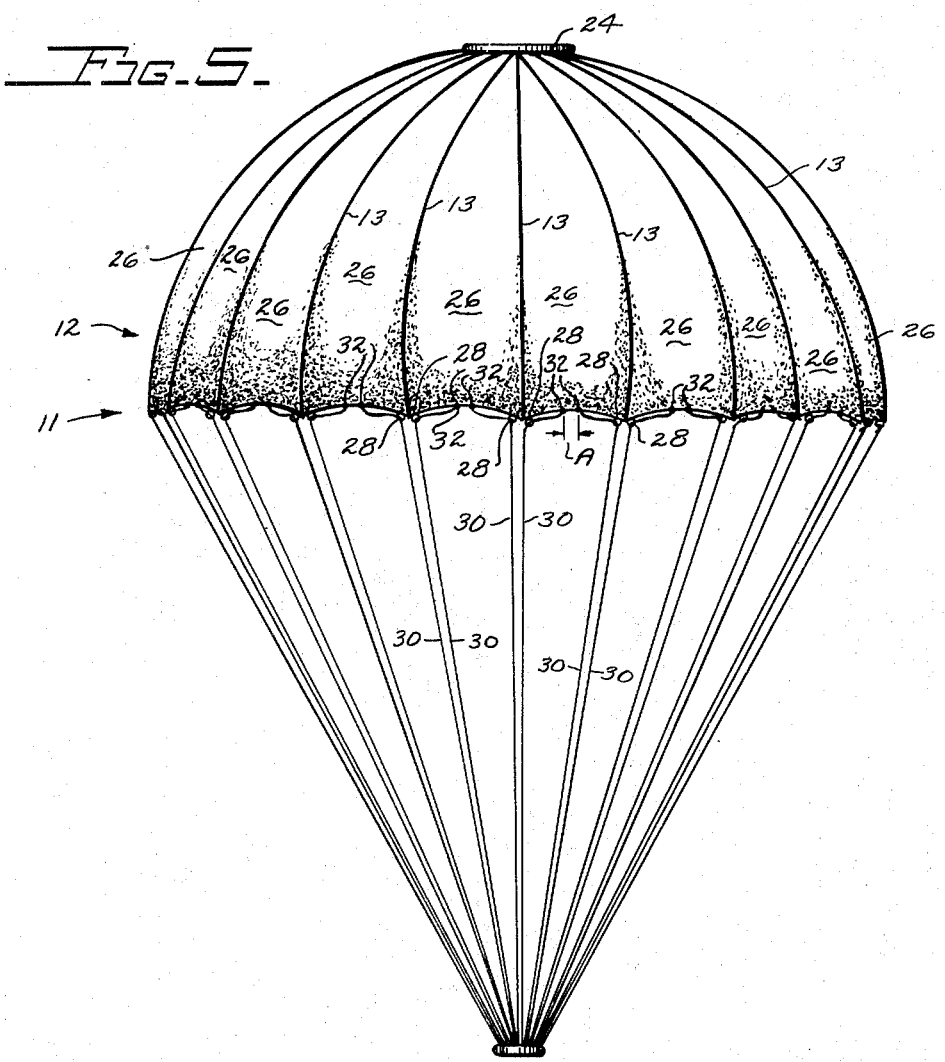
INVENTOR.
MARK HATTAN
BY Wade Krouty AND
Frederick W. Cotterman
ATTORNEYS Patented Oct. 17, 1950

2,525,798

UNITED STATES PATENT OFFICE 2,525,798

SHOCKLESS PARACHUTE

Mark Hattan, Pasadena, Calif.

Application March 8, 1948, Serial No. 13,730

9 Claims. (Cl. 244—142)

(Granted under the act of March 3, 1883, as amended April 30, 1928; 370 O. G. 757)

The invention described herein may be manufactured by or for the United States Government for governmental purposes without payment to me of any royalty thereon.

This invention relates to parachutes and particularly to parachutes adapted for use in modern high speed aircraft.

An object of the invention is to provide a parachute of this kind with means to mitigate the opening shock.

Another object is to accomplish the foregoing object with a minimum addition to a standard parachute.

More specifically, an object of the invention is to provide means for initially maintaining the greater portion of the skirt of the canopy in a gathered or reefed condition, said means, however, being movable in response to a reduction in the shroud line tension to a value below the distending force at the canopy skirt to allow the canopy to open, to the end that full opening of the parachute is distributed over a longer period of time and the shock proportionately lessened.

Other objects and advantages will become evident upon consideration of the following description taken in conjunction with the drawing, wherein:

Fig. 1 is an elevation of one form of my improved parachute as it appears right after it has been drawn from the pack and before it has started to open.

Fig. 2 is a view similar to Fig. 1 but in the initial opening stage.

Fig. 3 is a view similar to Fig. 1 but taken after the canopy has reached maximum opening.

Fig. 4 is a bottom view of the canopy as shown in Fig. 3.

Fig. 5 shows a modified construction for carrying my invention into effect, the parachute being shown in the fully opened state.

Like reference characters refer to like parts throughout the several views.

Since the development of present day high speed aircraft the difficulties of parachute landing have been greatly multiplied. When a parachutist debarks from an aircraft in flight he momentarily takes the same lateral speed as the craft. If this speed is as much as five or six hundred M. P. H. it would obviously be catastrophic to allow a parachute to open fully and, in the matter of a portion of a second, reduce the speed of the chutist to a small fraction of his speed at debarkation. It is the purpose of this invention in such a situation to delay full opening of the parachute until, in the absence of continued impelling force, air resistance has reduced his speed to a safe value for the opening of the chute.

The parachute 10 shown in Figs. 1 through 4 is made up of the usual segmental panels 12 stitched together at 13, the panels being twenty in number in the illustrative example shown, with an equal number of shroud lines 14 which may be gathered by means of rings 16 into groups of five lines each thereby gathering the panels 12 of the canopy 18 at the skirt into groups of four controlled panels each, as at 20, leaving one free panel 22 between each group of four.

In packing the parachute, the rings 16 are preferably pushed upward substantially against the lower edge of the panels 12 (see Fig. 1), the parachute then being otherwise packed as in common practice. When the chutist jumps from a plane which is moving at the rate of four or five hundred M. P. H., and the pilot chute (not shown) draws the parachute 10 from the pack, there is at first a tremendous tension in the shroud lines 14, due to the drag of the open pilot chute and of the collapsed canopy at that high speed. This high tension in the shroud lines 14 and relatively low distension force in the canopy at high speeds will temporarily keep the parachute in the condition shown in Fig. 1, since at this time the opening at the skirt is at its smallest diameter and therefore the tendency of the canopy to open is at a minimum.

As the air resistance continues to oppose the movement of the parachute and chutist and the speed is thereby reduced to a point where the tension in the shroud lines reaches a value lower than the distending force within the canopy, the parachute first assumes the condition shown in Fig. 2 where the free panels 22 have billowed out in mushroom fashion and are spreading the panels of the groups 20. In order to spread the panels of the groups 20, however, the rings 16 must be forced downward, and, the farther the rings descend along the shroud lines, the greater the spreading force of the groups 20 must be to keep the rings moving, so that when the rings 16 reach a position about half way down the length of the shroud lines 14 as in Fig. 3, the spreading force of the groups 20 will not move the rings farther because of the friction between the rings 16 and the shroud lines 14. Stops (not shown) may be positioned on the groups 14 at this or any other selected point, if desired, so that downward movement of the rings will always be arrested at the same point.

From the foregoing it will be evident that the mitigation of the opening shock is brought about in two different ways by this reefing system. (1) Chute opening is delayed because of the high shroud line tension and low distending force at the reefed canopy skirt. (2) When the canopy does start to open at the low speed point its prolonged opening period causes it to have only half the shock that a standard non-reefed canopy has when opening at the same speed.

By reference to Figs. 3 and 4 it will be seen that the normal circular form of the open canopy 12 is modified by the half-way position of the rings 16 on the shroud lines 14, the free panels 22 being turned under most, the two outer panels of the groups 20 somewhat less, and the two middle panels of the groups 20 still less, resulting in a somewhat square configuration of the open canopy at the lower edge of the skirt (see Fig. 4) but leaving it more nearly round a short way up from the lower edge. The fact that the canopy 18, open as in Figs. 3 and 4, resists oscillation to an unusual degree is attributed to the somewhat square contour around the lower edge.

From the foregoing description with reference to Figs. 1 through 4, it will be seen that by the addition to a standard parachute of four rings 16, a time delay opening is provided which is a positive necessity in debarking from a modern high speed plane.

In the modification 11 shown in Fig. 5, a standard canopy 12, at the seam 13 where the panels 26 are joined, is provided with a pair of rings 28, which are securely fastened to the edges of the panels. Through each pair of rings 28 a pair of shroud lines 30 passes, the upper ends of the shroud lines being attached to the edges of the panels as at 32. A downward pull on the shroud lines 30 will draw the points 32 toward the rings 28 when the canopy distending force is low and thus gather the bottom of the canopy, the amount of gathering, and consequently the opening of the canopy at the lower edge of the skirt, being controlled by varying the dimension A between the attachment points 32.

Instead of the two rings 28 per panel, two small pulleys per panel may be substituted, or, a single ring may be substituted for the two rings 28 and pairs of shroud lines 30 passed, each pair through a single ring, then to the spread apart points 32.

The procedure in packing the parachute 11, Fig. 5, may preferably though not necessarily, be substantially as follows: The shroud lines 30 may be drawn down as far as possible, whereby the lower edge of the canopy is gathered to a circumference of slightly more than A×N wherein A is the distance between points 32 and N is the number of panels. The parachute may then be packed substantially as in standard practice.

As hereinbefore described with reference to Figs. 1 through 4, the heavy strain in the shroud lines 30 right after the chutist jumps and while the speed is still high keeps the area of the opening at the skirt of the parachute at a value very little greater than the combined openings through which air may escape from the canopy, assuming the opening at the skirt to have been determined by a judicious selection of the dimension A, so that the force being applied to expand and open the canopy is less than the pull of the shroud lines at this high speed. It is noted, however, that, using a standard apex opening, much the greater portion of the escaping air is due to the porosity of the canopy fabric.

When the air resistance reduces the speed to a relatively low value, the force tending to expand and open the canopy will be greater than the pull of the shroud lines and the canopy will consequently open as in Fig. 5.

Having thus described several exemplifications of my invention, I claim:

1. A nonoscillating parachute which comprises a substantially hemispheroidal canopy made up of a series of panels joined together at equally spaced meridians of the hemispheroid, shroud lines of equal length extending from the skirt of the canopy at the lines of juncture between panels, said shroud lines being joined at the lower ends and gathered into at least three groups, and a single ring loosely surrounding each group substantially midway of the tops and bottoms of the shroud lines whereby the skirt is drawn to a polygonal pattern at the lower edge having sides equal to the number of groups.

2. In a parachute, a canopy of a substantially hemispheroidal shape having a series of shroud lines of equal length equally spaced around the skirt and all joined together at the lower ends, said shroud lines being divided into three or more groups with an equal number of lines in each group and a ring surrounding each group intermediate the tops and bottoms of the shroud lines, whereby the lower edge of the skirt is drawn into the shape of a polygon having sides equal to the number of groups whereby the parachute is nonoscillating.

3. A method of converting an oscillating parachute of the kind having a canopy of a substantially hemispheroidal shape and a series of shroud lines all of the same length circumferentially equally spaced around the skirt of the canopy with the lower ends of the lines converging in the canopy axis, into a nonoscillating parachute, which consists of dividing the shroud lines into at least three groups with an equal number of lines in each group, and bringing together the several lines of each group at a point intermediate the lower ends of the lines and the point of attachment to the lower edge of the skirt.

4. A method of making a nonoscillating parachute from a parachute having a substantially hemispheroidal canopy and a plurality of shroud lines all of the same length circumferentially equally spaced around the lower edge of the canopy, which consists of dividing the shroud lines into at least three groups, and bringing together the several lines of each group from the lower ends of the lines to a point substantially midway between the lower ends of the lines and their points of attachment at the lower edge of the canopy.

5. A parachute comprising a canopy composed of a plurality of panels and a plurality of circumferentially spaced shroud lines extending from the canopy at the joints between the panels, the free ends of the shroud lines being brought together below the canopy substantially on the axis thereof, said shroud lines being divided into at least three groups, skirt gathering rings, one loosely surrounding each group, said rings being slidable over the groups to points adjacent the skirt, whereby the panels at the skirt are gathered into groups wherein each group is connected to the next by an ungathered panel, or slidable to a point intermediate the ends of the shroud lines to draw the skirt of the canopy into a polygonal shape corresponding to the number of said groups.

6. A parachute having delayed opening characteristics which comprises a canopy having leakage openings, shroud lines having the upper ends circumferentially spaced around the skirt of the canopy and the lower ends brought together and secured to a load carrying member, whereby load on said load carrying member tends to keep the skirt of the canopy gathered, the tendency being less as the speed decreases and the gathering being so controlled as to leave a skirt opening slightly larger than the leakage openings whereby there is a slight distending force within the canopy, said shroud lines being divided into a plurality of circumferentially spaced groups, a friction ring encircling each group normally adjacent the edge of the skirt resisting distension of said canopy but operative to be forced downward on the shroud lines by distension of the canopy, whereby, until the speed of the load decreases until the canopy closing tendency is less than the distending force, the canopy can not open.

7. A parachute having delayed opening characteristics which comprises a canopy having leakage openings, shroud lines having the upper ends circumferentially spaced around the skirt of the canopy and the lower ends brought together and secured to a load carrying member, whereby load on said load carrying member tends to keep the skirt of the canopy gathered, the tendency being less as the speed decreases and the gathering being so controlled as to leave a skirt opening slightly larger than the leakage openings, whereby there is a slight distending force within the canopy, friction means on the shroud lines adjacent the skirt resisting distension of said canopy but operative to be forced downward on the shroud lines by distension of the canopy, whereby until the speed of the load decreases until the canopy closing tendency is less than the distending force, the canopy can not open.

8. A nonoscillating parachute having delayed opening characteristics which comprises a canopy having leakage openings with a plurality of shroud lines of equal length circumferentially spaced around the lower edge of the canopy skirt, the shroud lines being secured to a load carrying member at their lower ends whereby the speed of the load influences the force tending to keep the canopy closed, said lines being divided into at least three groups and a separate ring surrounding each group, said rings being slidable over their groups from an upper position adjacent the skirt where they assist in maintaining the canopy in a closed state to a lower position substantially midway between the upper position and the load carrying member where they draw the canopy into a polygonal figure having sides equal to the number of groups, said rings in the upper position gathering the skirt to an opening which will pass a slightly greater volume of air than the leakage openings, whereby an opening force is exerted which is insufficient to open the canopy at the higher speeds of the load, but sufficient to open the canopy after the speed of the load is reduced to a predetermined value.

9. In a parachute comprising shroud lines and a canopy having air leakage openings therethrough, means to gather the canopy around the skirt comprising a series of pairs of rings, said pairs being equally spaced around the lower edge of the canopy, the rings of a pair being close together and the shroud lines being arranged in an equal number of pairs, the upper ends of each pair of said shroud lines passing through a pair of said rings then extending one circumferentially opposite the other around the lower edge to a point of fastening, said points of fastening of interfacing lines of adjacent pairs being spaced apart a preselected distance whereby the degree of gathering is controlled, means operative above a predetermined speed of the shroud line load to hold the canopy in the gathered state and means to limit the degree of gathering to a value which will provide a bottom opening slightly larger than the combined leakage openings, whereby, upon a reduction in said speed below said predetermined value, the canopy will open automatically.

MARK HATTAN.

REFERENCES CITED

The following references are of record in the file of this patent:

UNITED STATES PATENTS

| Number | Name | Date |
|---|---|---|
| 1,266,508 | Ludtke | May 14, 1918 |
| 1,771,261 | Lendner | July 22, 1930 |
| 2,267,791 | Finlayson | Dec. 30, 1941 |
| 2,310,359 | Finlayson | Feb. 9, 1943 |
| 2,392,270 | Smith | Jan. 1, 1946 |

FOREIGN PATENTS

| Number | Country | Date |
|---|---|---|
| 128,669 | Great Britain | July 3, 1919 |